United States Patent
Jiang et al.

(10) Patent No.: US 12,284,619 B2
(45) Date of Patent: Apr. 22, 2025

(54) METHOD AND APPARATUS FOR TRANSMITTING SIGNAL AND COMMUNICATION SYSTEM

(71) Applicant: FUJITSU LIMITED, Kawasaki (JP)

(72) Inventors: Qinyan Jiang, Beijing (CN); Tsuyoshi Shimomura, Yokohama (JP); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 269 days.

(21) Appl. No.: 17/705,198

(22) Filed: Mar. 25, 2022

(65) Prior Publication Data

US 2022/0217662 A1  Jul. 7, 2022

Related U.S. Application Data

(63) Continuation of application No. PCT/CN2019/109264, filed on Sep. 30, 2019.

(51) Int. Cl.
| | |
|---|---|
| *H04W 56/00* | (2009.01) |
| *H04W 72/0453* | (2023.01) |
| *H04W 72/1273* | (2023.01) |
| *H04W 72/23* | (2023.01) |

(52) U.S. Cl.
CPC ..... *H04W 56/001* (2013.01); *H04W 72/0453* (2013.01); *H04W 72/1273* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2018/0192383 A1 | 7/2018 | Nam et al. | |
| 2019/0159203 A1 | 5/2019 | Kim et al. | |
| 2019/0159226 A1* | 5/2019 | Ly | H04W 72/1263 |
| 2019/0200307 A1* | 6/2019 | Si | H04W 72/0453 |

(Continued)

FOREIGN PATENT DOCUMENTS

| | | |
|---|---|---|
| CN | 110034891 A | 7/2019 |
| CN | 110035493 A | 7/2019 |
| CN | 110168972 A | 8/2019 |

OTHER PUBLICATIONS

International Search Report and Written Opinion of the International Searching Authority issued by the China National Intellectual Property Administration for corresponding International Patent Application No. PCT/CN2019/109264, mailed on Jun. 29, 2020, with an English translation.

(Continued)

*Primary Examiner* — Adnan Baig
(74) *Attorney, Agent, or Firm* — Myers Wolin, LLC

(57) ABSTRACT

Methods and apparatus for transmitting a signal and a communication system. The apparatus includes a receiver configured to: receive a first synchronization signal/physical broadcast channel block (SS/PBCH block, SSB), the first synchronization signal/physical broadcast channel block being not located on a first synchronization raster; and receive physical downlink control channel (PDCCH), the physical downlink control channel (PDCCH) being used to schedule a physical downlink shared channel (PDSCH) for carrying remaining minimum system information/system information block 1 (RMSI/SIB1).

14 Claims, 7 Drawing Sheets

(56) References Cited

U.S. PATENT DOCUMENTS

| | | | |
|---|---|---|---|
| 2019/0222340 A1 | 7/2019 | Kaikkonen et al. | |
| 2019/0327767 A1* | 10/2019 | Islam | H04L 27/2602 |
| 2020/0162931 A1* | 5/2020 | Chakraborty | H04W 48/10 |
| 2020/0359343 A1* | 11/2020 | Da | H04J 11/0069 |
| 2021/0058931 A1 | 2/2021 | Da et al. | |
| 2021/0377950 A1* | 12/2021 | Takahashi | H04W 56/001 |
| 2022/0039158 A1* | 2/2022 | Awadin | H04W 74/0816 |

OTHER PUBLICATIONS

Qualcomm, "Status Report to TSG: NR-based Access to Unlicensed Spectrum", Agenda Item: 9.4.3, 3GPP TSG-RAN Meeting #85, RP-191858, Newport Beach, USA, Sep. 16-20, 2019.

Qualcomm, "Status Report to TSG: NR-based Access to Unlicensed Spectrum", Agenda Item: 9.4.3, 3GPP TSG-RAN Meeting #85, RP-192269, revision of RP-191858, Newport Beach, USA, Sep. 16-20, 2019.

Extended European search report with the supplementary European search report and the European search opinion issued by the European Patent Office for corresponding European Patent Application No. 19948132.6-1216, mailed on Sep. 1, 2022.

Examination Report issued by the Indian Patent Office for corresponding on Nov. 29, 2022 for corresponding Indian Patent Application No. 202237016619, dated Nov. 29, 2022, with an English translation.

Notice of Reasons for Refusal issued by the Japan Patent Office for corresponding Japanese Patent Application No. 2022-519224, mailed on Apr. 18, 2023, with an English translation.

Ad-hoc Chair (Ericsson), "Chairman's notes of AI 7.2.2 NR-based Access to Unlicensed Spectrum", Agenda Item: 7.2.2, 3GPP TSG-RAN WG1 Meeting #98, Tdoc R1-1909756, Prague, Czech Republic, Aug. 26-30, 2019.

Notice of Reasons for Refusal issued by the Japan Patent Office for corresponding Japanese Patent Application No. 2022-519224, mailed on Aug. 29, 2023, with an English translation.

Qualcomm Incorporated, "Feature lead summary on initial access signals and channels for NR-U", Agenda Item: 7.2.2.1.1, 3GPP TSG-RAN WG1 Meeting #98, R1-1909814, Prague, CZ, Aug. 26-30, 2019.

Notice of Preliminary Rejection issued by the Korean Intellectual Property Office for corresponding Korean Patent Application No. 10-2022-7010198, mailed on Oct. 14, 2024, with an English translation.

Nokia et al., "On indication of valid locations of SS/PBCH with RMSI", Agenda Item: 7.1.1.2.1, 3GPP TSG-RAN WG1 Meeting #92, R1-1802892, Athens, Greece, Feb. 26-Mar. 2, 2018.

Ericsson, "SSB raster design of Rel-16 NR-U", Agenda Item: 8.1.2, 3GPP TSG-RAN WG4 Meeting #90bis, R4-1904255, Xi'an, China, Apr. 8-13, 2019.

Ericsson, "SSB raster design of Rel-16 NR-U for 5GHz band", Agenda Item 9.1.2.3, 3GPP TSG-RAN4 Meeting #92, R4-1909393, Ljubljana, Slovenia, Aug. 26-30, 2019.

First Notification of Office Action and Search Report issued by the China National Intellectual Property Administration for corresponding Chinese Patent Application No. 201980100589.3, mailed on Jan. 20, 2025, with an English translation.

* cited by examiner

METHOD AND APPARATUS FOR TRANSMITTING SIGNAL AND COMMUNICATION SYSTEM

CROSS-REFERENCE TO RELATED APPLICATION

This application is a continuation application of International Application PCT/CN2019/109264 filed on Sep. 30, 2019 and designated the U.S., the entire contents of which are incorporated herein by reference.

TECHNICAL FIELD

The embodiments of the present disclosure relate to the field of communication technologies.

BACKGROUND

In existing communication protocols (such as Rel-15 NR), a global synchronization/frequency raster, or a synchronization raster/SS raster, is defined for the frequency range of 0 to 100 GHz. The synchronization raster characterizes a frequency-domain position of a synchronization signal/physical broadcast channel block (SS/PBCH block) (or referred to as a synchronization signal block (SSB)) that may be used for acquiring system-related information in a case where a terminal equipment receives no explicit signaling indicating a position of a synchronization signal/physical broadcast channel block, and one frequency-domain position corresponds to a global synchronization channel number (GSCN). On this basis, value ranges of GSCN are defined respectively for a part of NR operating bands, that is, corresponding available synchronization rasters are defined.

Unlicensed frequency bands are important parts of spectral resources. Currently, many systems support operating on unlicensed frequency bands, such as Wi-Fi, and Long Term Evolution (LTE) license assisted access (LAA). However, currently, a New Radio (NR) system does not support operating on unlicensed frequency bands.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In the time domain, one SSB may include 4 symbols, and in the frequency domain, one SSB may include 240 subcarriers, in other words, it includes 20 RBs, each RB including 12 subcarriers. FIG. 1A is a schematic diagram of a time-frequency domain structure of an SSB. Viewing from the frequency domain, an SSB may or may not be located on a synchronized raster. If subcarriers of an SSB and a synchronization raster satisfy a predefined mapping relationship, the SSB is located on the synchronization raster. On the contrary, if the subcarriers of an SSB and a synchronization raster do not satisfy the predefined mapping relationship, the SSB is not located on the synchronization raster. The predefined mapping relationship, for example, refers to that a synchronization raster corresponds to a specific subcarrier of an SSB, and the specific subcarrier is predefined. For example, as shown in FIG. 1B, the specific subcarrier is a 121st subcarrier of the SSB; in other words, the specific subcarrier is a first subcarrier of a 10th PRB of the SSB. The predefinition refers to definition in a communication protocol.

It was found by the inventors of this disclosure that in the existing NR system design, if an SSB is not located on a synchronization raster, since it is mainly used for measurement by a terminal equipment and not used for cell selection or reselection, there is no need for the terminal equipment to receive SIB1 according to the SSB. However, it was further found by the inventors of this disclosure that with the further evolution of an NR system, it is required that the terminal equipment receives SIB1 according to the SSB not located on the synchronization raster.

Embodiments of this disclosure provide a method and apparatus for transmitting a signal and a communication system. A first synchronization signal/physical broadcast channel block not located on a synchronization raster is associated with a control resource set, the control resource set being used to transmit a PDCCH, the PDCCH being used to schedule a physical downlink shared channel (PDSCH) used to carry remaining minimum system information/system information block 1 (RMSI/SIB1). Hence, a terminal equipment is able to obtain the PDSCH scheduled by the PDCCH after receiving the PDCCH, and obtains the remaining minimum system information/system information block 1 (RMSI/SIB1) carried in the PDSCH. According to a first aspect of the embodiments of this disclosure, there is provided a method for transmitting a signal, applicable to a terminal equipment, the method including: receiving a first synchronization signal/physical broadcast channel block (SS/PBCH block, SSB), the first synchronization signal/physical broadcast channel block being not located on a first synchronization raster; and receiving physical downlink control channel (PDCCH), the physical downlink control channel (PDCCH) being used to schedule a physical downlink shared channel (PDSCH) for carrying remaining minimum system information/system information block 1 (RMSI/SIB1).

According to a second aspect of the embodiments of this disclosure, there is provided a method for transmitting a signal, applicable to a network device, the method including: transmitting a first synchronization signal/physical broadcast channel block (SS/PBCH block, SSB) not located on a first synchronization raster; and transmitting physical downlink control channel (PDCCH), the physical downlink control channel (PDCCH) being used to schedule a physical downlink shared channel (PDSCH) for carrying remaining minimum system information/system information block 1 (RMSI/SIB1).

According to a third aspect of the embodiments of this disclosure, there is provided an apparatus for transmitting a signal, applicable to a terminal equipment, the apparatus carrying out the method for transmitting a signal of the first aspect of the embodiments of this disclosure.

According to a fourth aspect of the embodiments of this disclosure, there is provided an apparatus for transmitting a signal, applicable to a network device, the apparatus carrying out the method for transmitting a signal of the second aspect of the embodiments of this disclosure.

According to a fifth aspect of the embodiments of this disclosure, there is provided a terminal equipment, including the apparatus for transmitting a signal of the third aspect of the embodiments of this disclosure.

According to a sixth aspect of the embodiments of this disclosure, there is provided a network device, including the apparatus for transmitting a signal of the fourth aspect of the embodiments of this disclosure.

According to a seventh aspect of the embodiments of this disclosure, there is provided a communication system, including the terminal equipment of the fifth aspect and the network device of the sixth aspect of the embodiments of this disclosure.

According to an eighth aspect of the embodiments of this disclosure, there is provided a computer readable program, which, when executed in an apparatus for transmitting a signal or a terminal equipment, will cause the apparatus for transmitting a signal or the terminal equipment to carry out the method for transmitting a signal as described in the first aspect of the embodiments of this disclosure.

According to a ninth aspect of the embodiments of this disclosure, there is provided a computer storage medium, including a computer readable program, which will cause an apparatus for transmitting a signal or a terminal equipment to carry out the method for transmitting a signal as described in the first aspect of the embodiments of this disclosure.

According to a tenth aspect of the embodiments of this disclosure, there is provided a computer readable program, which, when executed in an apparatus for transmitting a signal or a network device, will cause the apparatus for transmitting a signal or the network device to carry out the method for transmitting a signal as described in the second aspect of the embodiments of this disclosure.

According to an eleventh aspect of the embodiments of this disclosure, there is provided a computer storage medium, including a computer readable program, which will cause an apparatus for transmitting a signal or a network device to carry out the method for transmitting a signal as described in the second aspect of the embodiments of this disclosure.

An advantage of the embodiments of this disclosure exists in that a first synchronization signal/physical broadcast channel block not located on a synchronization raster is associated with a control resource set, the control resource set being used to transmit a PDCCH, the PDCCH being used to schedule a physical downlink shared channel (PDSCH) used to carry remaining minimum system information/system information block 1 (RMSI/SIB1). Hence, the terminal equipment is able to obtain the PDSCH scheduled by the PDCCH after receiving the PDCCH, and obtains the remaining minimum system information/system information block 1 (RMSI/SIB1) carried in the PDSCH.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

Figure 1A:
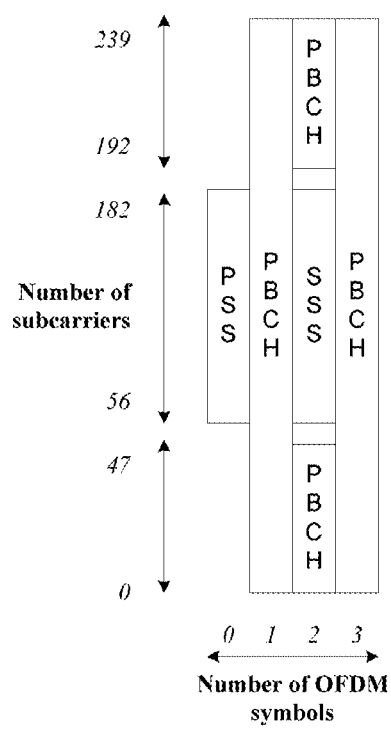
FIG. 1A is a schematic diagram of a time-frequency domain structure of an SSB.
Figure 1B:
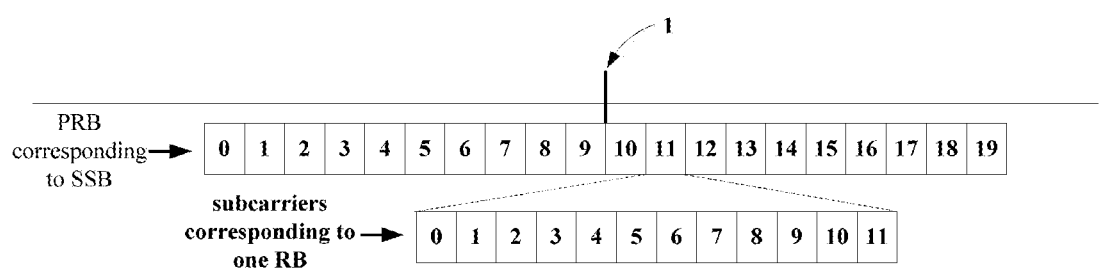
FIG. 1B is a schematic diagram of an SSB located on a synchronization raster.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "a terminal equipment (TE)" refers to, for example, an equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Scenarios of the embodiments of this disclosure shall be described below by way of examples; however, this disclosure is not limited thereto.

Figure 2:
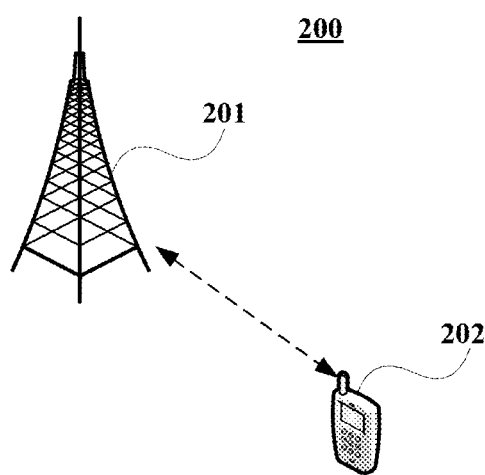
FIG. 2 is a schematic diagram of a communication system of an embodiment of this disclosure.

FIG. 2 is a schematic diagram of a communication system of an embodiment of this disclosure, in which a case where a terminal equipment and a network device are taken as examples is schematically shown. As shown in FIG. 2, a communication system 200 may include a network device 201 and a terminal equipment 202 (for the sake of simplicity, an example having only one terminal equipment is schematically given in FIG. 2).

In the embodiment of this disclosure, existing traffics or traffics that may be implemented in the future may be performed between the network device 201 and the terminal equipment 202. For example, such traffics may include but not limited to enhanced mobile broadband (eMBB), massive machine type communication (MTC), and ultra-reliable and low-latency communication (URLLC).

The terminal equipment 202 may transmit data to the network device 201, such as in a grant-free manner. The network device 201 may receive data transmitted by one or more terminal equipments 202, and feed back information to the terminal equipment 202, such as acknowledgement (ACK)/non-acknowledgement (NACK) information, and the terminal equipment 202 may confirm to terminate a transmission process, or may perform transmission of new data, or may perform data retransmission.

Following description shall be given by taking that a network device is taken as a receiver end and a terminal equipment is taken as a transmitter end in a communication system as an example; however, this disclosure is not limited thereto, and the transmitter end and/or the receiver end may also be other devices. For example, this disclosure is not only applicable to uplink grant-free transmission between a network device and a terminal equipment, but also applies to sidelink grant-free transmission between two terminal equipments.

English names of abbreviations concerned in this disclosure are as follows:
CORESET: control resource set
CRB: common resource block
PRB: physical resource block (which is interchangeable with/equivalent to RB in some cases)
RB: resource block
RE: resource element
BWP: bandwidth part
DCI: downlink control information
PDCCH: physical downlink control channel
PDSCH: physical downlink shared channel
PBCH: physical broadcast channel
DM-RS: demodulation reference signal PSS: primary synchronization signal
SSS: secondary synchronization signal
L1: layer 1 (physical Layer)
SSB: synchronization signal block, or synchronization signal/physical broadcast channel Block
PLMN: public land mobile network
SIB: system information block
SIB1 (also referred to as remaining minimum system information (RMSI): system information block 1, which is also referred to as remaining minimum system information
GSCN: global synchronization channel number
NR: New Radio
NR-ARFCN: NR absolute radio frequency channel number
SCS: subcarrier spacing
FR: frequency range
Cell-defining SSB (CD-SSB): an SSB associated with an RMSI
CORESET #0: control resource set CORESET #0, which is a control resource set at least used for SIB1 scheduling.

In the aspects of the embodiments of this disclosure, a "predetermined" parameter or a "preset" parameter may refer to a parameter that is predefined or set in a communication protocol.

In various aspects of the embodiments of this disclosure, meanings of such words as learning, determining and deciding are similar, and may be interchangeable in some cases.

First Aspect of the Embodiments

The embodiment of this disclosure provides a method for transmitting a signal, applicable to a terminal equipment, such as a terminal equipment 202.

Figure 3:
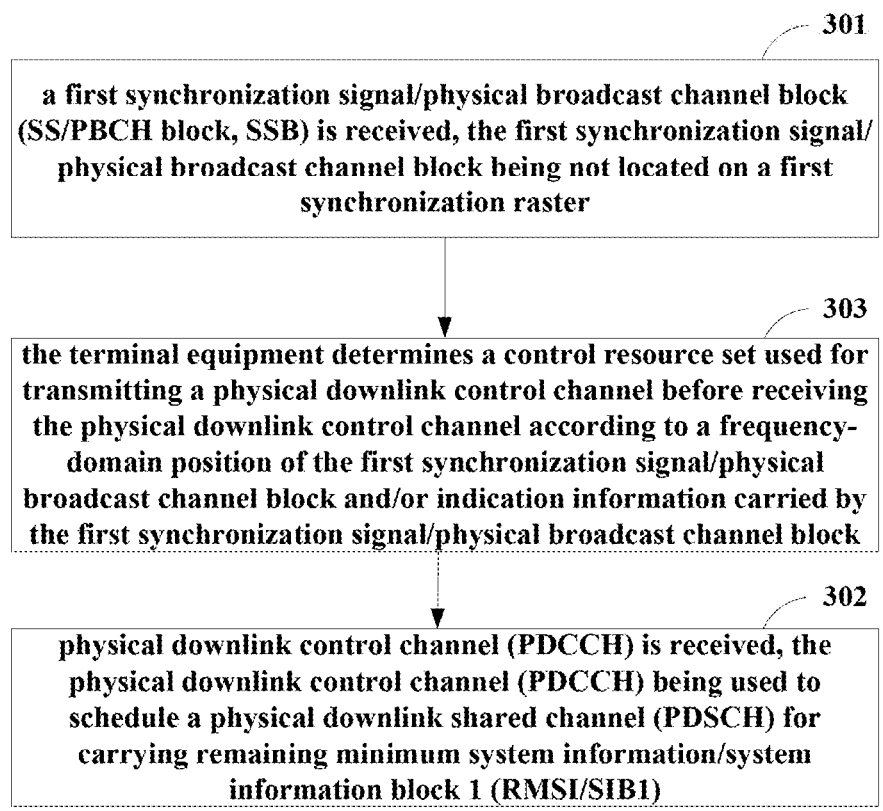
FIG. 3 is a schematic diagram of the method for transmitting a signal of the first aspect of the embodiments of this disclosure.

FIG. 3 is a schematic diagram of the method for transmitting a signal of the first aspect of the embodiments of this disclosure. As shown in FIG. 3, the method may include:
operation 301: a first synchronization signal/physical broadcast channel block (SS/PBCH block, SSB) is received, the first synchronization signal/physical broadcast channel block being not located on a first synchronization raster; and
operation 302: physical downlink control channel (PDCCH) is received, the physical downlink control channel (PDCCH) being used to schedule a physical downlink shared channel (PDSCH) for carrying remaining minimum system information/system information block 1 (RMSI/SIB1).

According to the first aspect of the embodiments of this disclosure, in the case that the first synchronization signal/physical broadcast channel block not located on the first synchronization raster is received, a PDCCH is received, the PDCCH being used for scheduling a physical downlink shared channel (PDSCH) used for carrying remaining minimum system information/system information block 1 (RMSI/SIB1). Thus, after receiving the PDCCH, the terminal equipment may obtain the PDSCH scheduled by the PDCCH, and obtain the remaining minimum system information/system information block 1 (RMSI/SIB1) carried in the PDSCH.

With the further evolution of NR systems, in some scenarios, it is required that the terminal equipment receives SIB1 according to the SSB not located on the synchronization raster.

For example, an NR system may possibly support operating on an unlicensed band (NR U). On the unlicensed band, networks of multiple operators may possibly be independently deployed on the same channel, and a problem of PCI confusion/collision may occur between networks of different operators. A possible solution to this problem is that the network device instructs the terminal equipment to measure and report CGI-related information of a cell, the CGI-related information at least including operator-related information, such as a public land mobile network identifier (PLMN ID). CGI-related information of a cell is transmitted in SIB1. If an SSB of a cell is not located on a synchronization raster, in order that the terminal equipment is able to obtain and report the CGI-related information of the cell, it is required that the terminal equipment receives SIB1 of the cell according to the SSB not located on the synchronization raster.

Since SIB1 is carried by the PDSCH, and the PDSCH is scheduled by the PDCCH, in order that the terminal equipment receives SIB1 of the cell, the terminal equipment needs to learn information on the PDCCH scheduling the PDSCH used to carry SIB1, such as a control resource set for transmitting the PDCCH, thereby monitoring and receiving the PDCCH, and hence receiving the PDSCH. Thus, if the terminal equipment is to receive SIB1 according to the SSB not located on the synchronization raster, the terminal equipment at least needs to learn the above control resource set according to the SSB.

In the first aspect of the embodiments of this disclosure, since Rel-15 only supports an NR system to operate on a licensed band, a corresponding available synchronization raster for an operating frequency band in the unlicensed band is not defined in existing protocols on the NR system. Therefore, in order to support the NR system to operate on the unlicensed band, it is required that a corresponding available synchronization raster is defined for an operating frequency band in the unlicensed band. In order to reduce a complexity of the terminal equipment receiving an SSB when no explicit signaling indicating a position of the SSB is received, fewer available synchronization rasters may be defined. For the sake of convenience of description, the available synchronization raster defined in the operating frequency band in the unlicensed band is hereinafter referred to as a first synchronization raster. An operating frequency band may include one or more sub-bands, and bandwidths of different sub-bands are identical or different. X (e.g., X=1) first synchronization rasters, for example, are predefined in a sub-band. A first synchronization raster may be identical to or different from a second synchronization raster described below with respect to a frequency-domain position. An interval between two adjacent first synchronization rasters is, for example, Y (for example, Y is an integer multiple of 1.44) MHz.

Figure 1C:
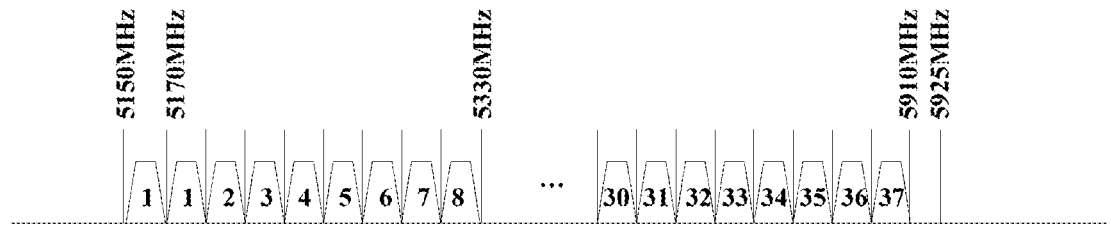
FIG. 1C is an example of sub-band division within an operating frequency band.

It is assumed that a frequency range to which an operating frequency band (such as n46) in an unlicensed frequency band corresponds is F1 (such as 5150)~F2 (such as 5925) MHz. Taking the operating frequency band as an example, FIG. 1C is an example of sub-band division within an operating frequency band. In FIG. 1C, bandwidths of multiple sub-bands are identical, and a bandwidth of a sub-band is 20 MHz.

Figure 1D:
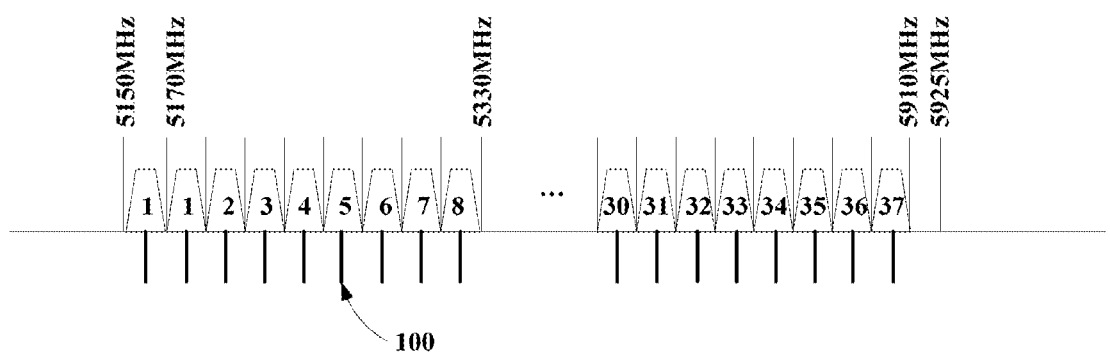
FIG. 1D is a schematic diagram of a positional relationship between the first synchronization raster and a sub-band.

FIG. 1D is a schematic diagram of a positional relationship between the first synchronization raster and a sub-band, in which a first synchronization raster 100 is predefined in a sub-band.

In Rel-15 NR, a synchronization raster defined for a frequency range of 0-100 GHz (i.e., a second synchronization rasters) is as shown in Table 1. According to Table 1, in the frequency range to which the operating frequency band corresponds, interval between two adjacent second synchronization rasters is 1.44 MHz.

TABLE 1

| Frequency range | Frequency-domain position $SS_{REF}$ of the SSB | GSCN | Range of GSCN |
|---|---|---|---|
| 0-3000 MHz | N * 1200 kHz + M * 50 kHz, N = 1:2499, M ∈ {1, 3, 5} (note) | 3N + (M − 3)/2 | 2-7498 |
| 3000-24250 MHz | 3000 MHz + N * 1.44 MHz N = 0:14756 | 7499 + N | 7499-22255 |
| 24250-100000 MHz | 24250.08 MHz + N * 17.28 MHz, N = 0:4383 | 22256 + N | 22256-26639 |

Note:
a default value of an operating frequency band of a spacing channel raster supporting only a subcarrier spacing is M = 3.

Figure 4:
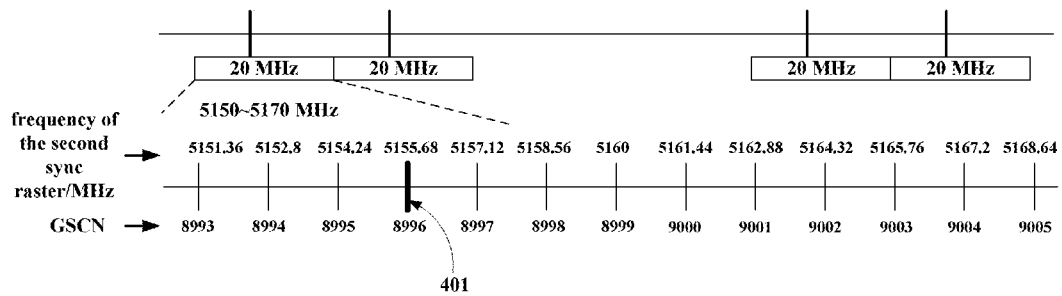
FIG. 4 is a schematic diagram of a first synchronization raster and a second synchronization raster.

FIG. 4 is a schematic diagram of a positional relationship between the first synchronization raster and the second synchronization raster. Taking a sub-band with a frequency range of 5150-5170 MHz as an example, frequency-domain positions of the second synchronization raster in the sub-band and corresponding GSCNs are as shown in FIG. 4. One first synchronization raster 401 is predefined in the sub-band, a frequency-domain position of the first synchronization raster 401 being identical to a frequency-domain position of the second synchronization raster corresponding to GSCN=8996. That is, the second synchronization raster corresponding to GSCN=8996 is the first synchronization raster in the sub-band.

In the first aspect of the embodiments of this disclosure, that the first synchronization signal/physical broadcast channel block (SSB) is not located on the first synchronization raster refers to that the first SSB subcarrier does not satisfy a predefined mapping relationship with the first synchronization raster. The predefined mapping relationship refers to, for example, that the first synchronization raster corresponds to a specific sub-carrier of the first SSB, the specific sub-carrier being predefined.

In the first aspect of the embodiments of this disclosure, the control resource set is used to transmit a control resource set used for scheduling the PDCCH carrying RMSI/SIB1 (in other words, the control resource set is a control resource set of Type0-PDCCH CSS set). The control resource set is CORESET #0. The control resource set includes time-domain resources and frequency-domain resources. For example, the control resource set includes 1 or 2 symbols in the time domain, and includes 48 physical resource blocks (in a case where a subcarrier spacing SCS is 30 KHz) or 96 physical resource blocks (in a case where a subcarrier spacing SCS is 15 KHz) in the frequency domain. And furthermore, resources of the control resource set in the frequency domain may also be represented by subcarriers. The terminal equipment 202 at least needs to learn positions of the frequency-domain resource of the control resource set, and receives the PDCCH transmitted by the control resource set according to the frequency-domain resource.

In the first aspect of the embodiments of this disclosure, the control resource set is associated with the first synchronization signal/physical broadcast channel block, which may be expressed as:

in the first aspect of the embodiments of this disclosure, as shown in FIG. 3, the method further includes:
operation 303: the terminal equipment 202 determines a control resource set used for transmitting a physical downlink control channel before receiving the physical downlink control channel according to a frequency-domain position of the first synchronization signal/physical broadcast channel block and/or indication information carried by the first synchronization signal/physical broadcast channel block.

In the first aspect of the embodiments of this disclosure, the control resource set used for transmitting the PDCCH scheduling the PDCCH carrying RMSI/SIB1 is associated with the first synchronization signal/physical broadcast channel block, hence, the terminal equipment 202 may determine the control resource set used for transmitting the physical downlink control channel according to the first synchronization signal/physical broadcast channel block (SSB).

Implementations of operation 303 shall be described below according to different implementations.
Implementation 1
The terminal equipment 202 determines the control resource set for transmitting the physical downlink control channel according to the frequency-domain position(s) of the first synchronization signal/physical broadcast channel block.

Implementation 1 shall be described below.
In at least one embodiment, the frequency-domain positional relationship between the control resource set and the first SSB is predefined. For example, a relative position or offset of a preset resource (i.e. a predetermined resource) in frequency-domain resources of the control resource set (CORESET) to a preset resource (i.e. a predetermined resource) in frequency-domain resources of the first synchronization signal/physical broadcast channel block is a first predetermined value (i.e. a predefined value). Thus, the terminal equipment may determine a frequency-domain position of the predetermined resource in the frequency-domain resources of the control resource set (CORESET) according to the frequency-domain position(s) of the first synchronization signal/physical broadcast channel block and the first predetermined value.

The predetermined resource in the frequency-domain resources of the control resource set may be an n-th resource block or subcarrier in the control resource set, where, n is a natural number, such as f first subcarrier in the control resource set. The predetermined resource in the frequency-domain resources of the first synchronization signal/physical broadcast channel block may be a k-th resource block or subcarrier in the first SSB, where, k is a natural number, such as a first subcarrier in the first SSB. In at least one other embodiment, the frequency-domain position of the control resource set in a sub-band is predefined, and a positional relationship between a sub-band where the control resource set is located and a sub-band where the first SSB is located is predefined. Therefore, the terminal equipment may determine the sub-band where the control resource set is located according to a sub-band where the first SSB is located, and as the frequency-domain position of the control resource set in a sub-band is predefined, the terminal equipment may further determine the frequency-domain position of the control resource set in the determined sub-band.

The sub-band where the first SSB is located is a sub-band where the frequency-domain resources of the first SSB or the predetermined resource in the frequency-domain resources of the first SSB is/are located. The predetermined resource is, for example, an s-th resource block or subcarrier in the first SSB, where, s is a natural number, such as an intermediate sub-carrier, i.e. a 121st sub-carrier, or a first sub-carrier of PRB 10. A relative position or offset of the sub-band where the control resource set is located to the sub-band where the first SSB is located is a second predetermined value (i.e. a predefined value); for example, the second predetermined value may be equal to 0, that is, the sub-band where the control resource set is located is the sub-band where the first SSB is located. The frequency-domain position of the control resource set in one sub-band may be predefined as the following position: a frequency-domain position related to a frequency-domain position of the first synchronization raster in the one sub-band; for example, the related one frequency-domain position may be a frequency-domain position obtained by adding to or subtracting a predetermined value from the frequency-domain position of the first synchronization raster, or a frequency-domain position related to the frequency-domain resource of the second SSB on the first synchronization raster in the one sub-band, wherein the second SSB is located on the first synchronization raster in the one sub-band; for example, the related one frequency-domain position may be a frequency-domain position obtained by adding to or subtracting a predetermined value from the frequency-domain resource of the second SSB.

Implementation 2

The terminal equipment 202 determines the control resource set for transmitting the physical downlink control channel according to the indication information carried by the first synchronization signal/physical broadcast channel block.

Implementation 2 shall be described below.

In Implementation 2, the indication information is used to indicate the frequency-domain position of the control resource set (e.g. CORESET #0).

The indication information may be carried in the first synchronization signal/physical broadcast channel block, such as being carried in a primary synchronization signal (PSS), and/or a secondary synchronization signal (SSS), and/or a physical broadcast channel (PBCH), and/or a physical broadcast channel demodulation reference signal (PBCH DMRS), in a first synchronization signal/physical broadcast channel block.

In various embodiments of Implementation 2, the indication information may indicate a sub-band and/or a frequency-domain position.

In one particular implementation, the indication information may indicate: a sub-band where the frequency-domain resources of the control resource set (CORESET) or a first predetermined resource in the frequency-domain resources of the control resource set are/is located; and/or frequency-domain positions of frequency-domain resources of the control resource set CORESET or a frequency-domain position of a second predetermined resource in frequency-domain resources of the CORESET, wherein the first predetermined resource may be represented by a resource block or a subcarrier, the second predetermined resource may be represented by a resource block or a subcarrier, and the first predetermined resource and the second predetermined resource may be identical or different.

In at least one embodiment, when the indication information indicates a sub-band, the terminal equipment may determine the sub-band where the frequency-domain resources of the control resource set (CORESET) are located according to the indication information. Thus, the terminal equipment may determine the frequency-domain resources of the control resource set according to the frequency-domain positions of the frequency-domain resources of the control resource set (CORESET) in a sub-band. For example, a frequency-domain position of the first predetermined resource of the control resource set in a sub-band where it is located is a preset position (i.e. the frequency-domain position is preset), or a frequency-domain position indicated by the indication information.

In at least one embodiment, in a case where the indication information indicates a sub-band, the indication information may indicate an index of the sub-band where the frequency-domain resources of the control resource set (CORESET) or the first predetermined resource in the frequency-domain resources of the control resource set are/is located; for example, the index of the sub-band may be expressed as a numeral value.

In at least one embodiment, in a case where the indication information indicates a channel, the indication information may also indicate a relative position of the sub-band where the frequency-domain resources of the control resource set (CORESET) or the first predetermined resource in the frequency-domain resources of the control resource set are/is located to a channel where the frequency-domain position of the first synchronization signal/physical broadcast channel block is located, wherein the frequency-domain position of the first synchronization signal/physical broadcast channel block (SSB) may be as described in Implementation 1, and may be, for example, a frequency-domain position of the k-th resource block or subcarrier in the first SSB, where, k is a natural number.

In at least one embodiment, in a case where the indication information indicates a sub-band, the indication information may indicate information related to a synchronization raster in a channel of the frequency-domain resources of the control resource set (CORESET) or the first predefined resource in the control resource set (CORESET).

For example, the indication information may indicate an offset between a global synchronization channel number (GSCN) of a second synchronization raster in a channel where the frequency-domain resources of the control resource set (CORESET) or the first predetermined resource are/is located and a global synchronization channel number (GSCN) of a second synchronization raster to which the first synchronization signal/physical broadcast channel block corresponds.

Figure 5:
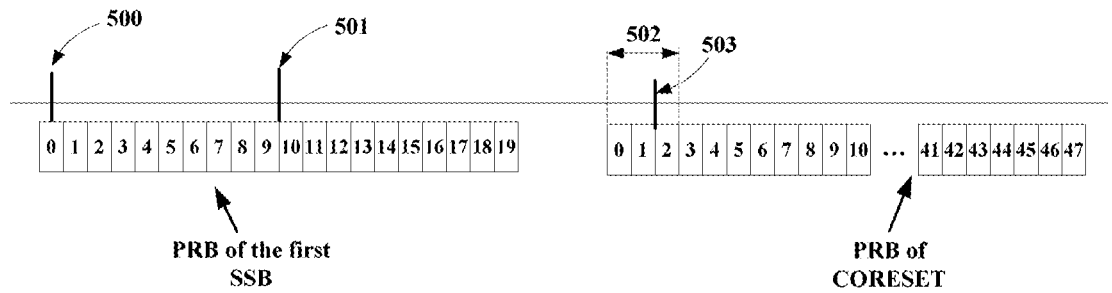
FIG. 5 is a schematic diagram of a correspondence relationship between a first SSB and the second synchronization raster.

FIG. 5 is a schematic diagram of a correspondence relationship between the first SSB and the second synchronization raster. As shown in FIG. 5, the first SSB is not transmitted at the first synchronization raster 500, but a first subcarrier of a resource block 10 of the first SSB has a frequency identical to that of the second synchronization raster 501, that is, the first SSB is located at the second synchronization raster 501. Hence, the second synchronization raster 501 is the second synchronization raster to which the first SSB corresponds. In a sub-band 502 where the first predetermined resource (such as a resource block 0) of the control resource set is located, there exists a second synchronized raster 503.

The terminal equipment may obtain a GSCN of the second synchronization raster 503 according to the GSCN of the second synchronization raster 501 and the above offset value, and may determine the frequency-domain position of the second synchronization raster 503 according to the GSCN of the second synchronization raster 503. As a frequency range of a sub-band is predefined, the terminal equipment may determine the sub-band 502 where the second synchronization raster 503 is located according to the frequency-domain position of the second synchronization raster 503, and the channel 502 is the sub-band where the first predetermined resource of the control resource set is located.

In at least one embodiment, when the indication information indicates the frequency-domain position, the terminal equipment may determine the frequency-domain position of the second predetermined resource in the control resource set (CORESET) according to the indication information.

For example, the indication information may indicate a relative position of the frequency-domain position of the second predetermined resource in the control resource set (CORESET) to a reference frequency-domain position.

The reference frequency-domain position may be a predefined frequency-domain position or a frequency-domain position indicated by the network device 201 to the terminal equipment 202.

In at least one embodiment, the reference frequency-domain position may be a frequency-domain position of a third predetermined resource of the first SSB; for example, the third predetermined resource is an m-th resource block or subcarrier in the frequency-domain resource of the first SSB, and a frequency-domain position of the third predetermined resource is the frequency-domain position of the third predetermined resource, m being a natural number.

In at least one embodiment, the reference frequency-domain position may also be a frequency-domain position of a fourth predetermined resource of the second SSB; for example, the fourth predetermined resource may be an L-th resource block or subcarrier in the frequency-domain resource of the second SSB, L being a natural number. In a particular implementation, the frequency-domain position of the fourth predetermined resources of the second SSB is a predefined frequency-domain position, or the frequency-domain position of the fourth predetermined resource of the second SSB may be indicated by the network device 201, via, for example, the indication information.

In at least one embodiment, the reference frequency-domain position may also be a frequency-domain position of the first synchronization raster in the sub-band where the frequency-domain resources of the control resource set (all the frequency-domain resources are in a channel) or the second predefined resource in the frequency-domain resources of the control resource set are/is located. In a particular implementation, the frequency-domain position of the first synchronization raster in the sub-band may be a predefined frequency-domain position, or the frequency-domain position of the first synchronization raster in the sub-band may be indicated by the network device 201, via, for example, the indication information.

Figure 6A:
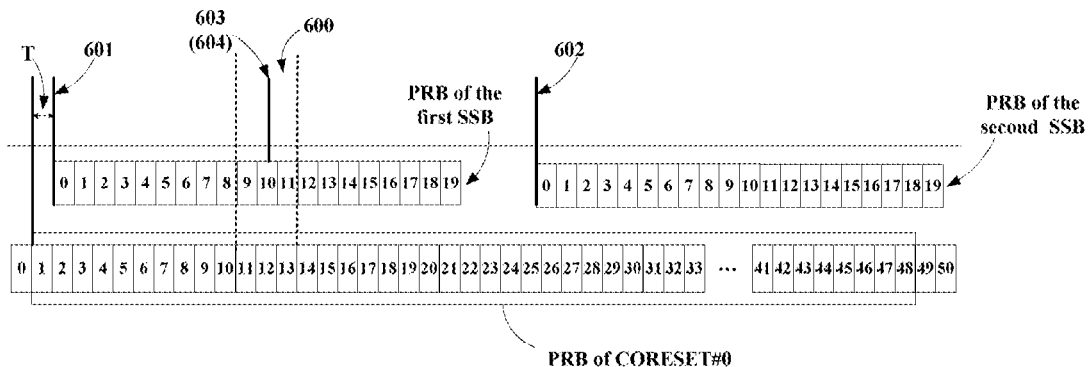
FIG. 6A is a schematic diagram of a reference frequency-domain position.

FIG. 6A is a schematic diagram of reference frequency-domain positions. As shown in FIG. 6A, a reference frequency-domain position 601 may be a frequency-domain position of a first resource block (e.g. resource block 0) or subcarrier in the first SSB. A reference frequency-domain position 602 may be a frequency-domain position of a first resource block (e.g. resource block 0) or subcarrier in the second SSB. A reference frequency-domain position 603 is a frequency-domain position of a first synchronization raster 604 in a channel 600 where a first resource block (e.g. resource block 0) or subcarrier in the frequency-domain resources of the control resource set (CORESET) are/is located.

In FIG. 6A, the reference frequency-domain position may be one of reference frequency-domain positions 601, 602 and 603. The indication information may indicate a relative position of the frequency-domain position of the second predetermined resource in the control resource set (CORESET) to the reference frequency-domain position. For example, when the reference frequency-domain position is the reference frequency-domain position 602, the indication information T may indicate a relative position of the reference frequency-domain position 602 to a frequency-domain position 605 of the second predetermined resource in the control resource set (CORESET) (such as a frequency-domain position of the first resource block or subcarrier).

In at least one embodiment, the relative position indicated by the indication information includes a relative position of an RB level and/or a relative position of a subcarrier level, which may be, for example, the number of resource blocks and/or the number of subcarriers; for example, the relative positions may be K1 resource blocks, or K2 subcarriers, or K3 resource blocks plus K4 subcarriers.

Figure 6B:
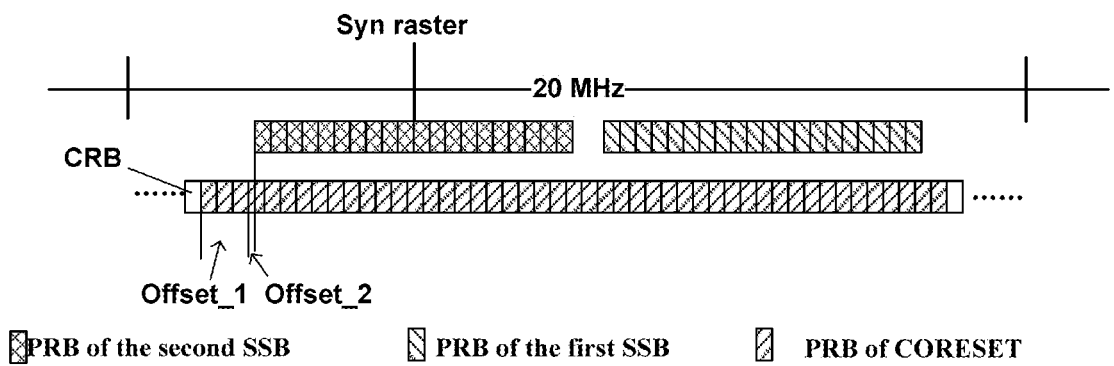
FIG. 6B is a schematic diagram of indicating a frequency-domain position of a control resource set by indication information based on CRB.

In a particular implementation, the indication information may indicate the frequency-domain position of the control resource set based on the CRB. FIG. 6B is a schematic diagram of indicating the frequency-domain position of the control resource set by the indication information based on the CRB. As shown in FIG. 6B, the indication information indicates an offset between an RB index to which a first RB of the control resource set corresponds and an RB index to which a first CRB overlapping a first RB of the second SSB corresponds, that is, a relative position of the RB level, such as offset 1 in FIG. 6A; and/or, the indication information indicates an offset between a first subcarrier of a first CRB overlapping a first RB of the second SSB and a first subcarrier of the second SSB, that is, a relative position of the subcarrier level, such as offset 2 in FIG. 6A.

On the other hand, the indication information may be included in an MIB of the PBCH. In order to minimize modification of the existing communication protocols and lower product production cycles and costs, the indication information, for example, corresponds to bits to which controlResourceSetZero and/or subCarrierSpacingCommon of the MIB in Rel-15 NR correspond(s). That is, the above relative position is indicated by multiplexing controlResourceSetZero and/or subCarrierSpacingCommon and/or ssb-SubcarrierOffset. For example, the relative position of the RB level is indicated by multiplexing controlResourceSetZero and/or subCarrierSpacingCommon, and the relative position of the subcarrier level is indicated by multiplexing ssb-SubcarrierOffset.

In Implementation 2, the indication information may also indicate both a sub-band and a frequency-domain position. For example, at least one bit in the indication information is used to indicate a channel, at least one other bit in the indication information is used to indicate a frequency-domain position, and manners of indicating the channel and indicating the frequency-domain position may be as described above. For another example, multiple combinations of channels and frequency-domain positions may be predefined, and the indication information may indicate one of the multiple combinations, so as to jointly indicate a sub-band and a frequency-domain position.

In this disclosure, Implementation 1 and Implementation 2 may be combined, that is, a part of parameters used for determining the frequency-domain resources of the control resource set may be determined according to the frequency-domain position of the first SSB, and another part of the parameters may be determined according to the indication of the indication information, in addition, a remaining part of the parameters may be predefined in communication protocols. For example, the terminal equipment 202 determines the sub-band where the frequency-domain resources of the control resource set are located according to the frequency-domain position of the first SSB, and obtains the frequency-domain position of the control resource set indicated based on the reference frequency-domain position according to the indication information, wherein the predefined reference frequency-domain position is the first synchronization raster of the sub-band where the control resource set is located.

In Implementation 1 and Implementation 2, there may exist a fixed mapping relationship between a frequency-domain position of each physical resource block of the first SSB and a frequency-domain position of each physical resource block in the control resource set (CORESET); for example, in the frequency domain, a physical resource block grid (PRB grid) of the first SSB kept is consistent with a physical resource block grid (PRB grid) of the control resource set or there exists a fixed offset therebetween. The network device 201 needs to transmit the first SSB and the control resource set (CORESET) in the above fixed mapping relationship.

Figure 7:
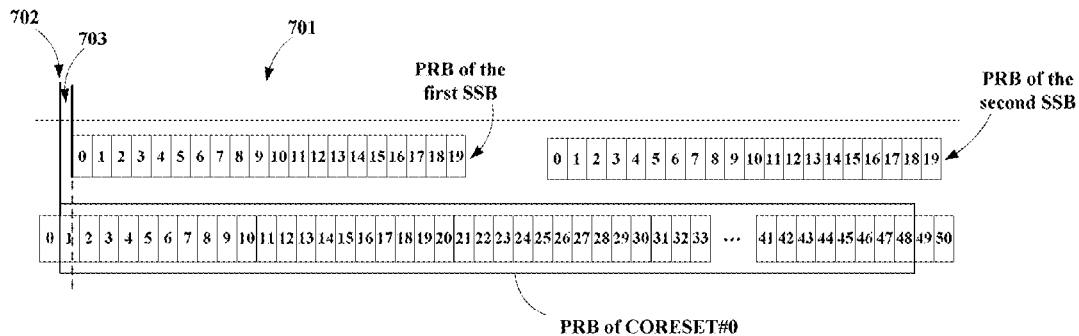
FIG. 7 is a schematic diagram of a correspondence relationship between a physical resource block grid of the first SSB and a physical resource block grid of the control resource set.

FIG. 7 is a schematic diagram of a correspondence relationship between the physical resource block grid of the first SSB and the physical resource block grid of the control resource set. As shown in FIG. 7, in the physical resource block grid (PRB grid) of the first SSB, there exists a fixed offset 703 between a starting frequency 701 of a physical resource block 10 and a starting frequency 702 of a physical resource block grid (PRB grid) of the control resource set.

In addition, this embodiment may not be limited thereto; for example, in FIG. 7, the starting frequency 701 of the physical resource block 10 and the starting frequency 702 of the physical resource block grid (PRB grid) of the control resource set may be identical, that is, the physical resource block grid (PRB grid) of the first SSB may be kept consistent with the physical resource block grid (PRB grid) of the control resource set.

Thus, in a case of receiving the first SSB, the terminal equipment may learn the physical resource block grid (PRB grid) of the control resource set associated with the first SSB according to the physical resource block grid (PRB grid) of the first SSB grid), and the frequency-domain resources of the control resource set are obtained according to other information. The other information is, for example, a channel where a starting frequency of the predetermined resource of the control resource set is located, and a relative position of a frequency-domain position of the second predetermined resource in the control resource set to the reference frequency-domain position. The other information may be predefined, or may be obtained via the above indication information.

In the first aspect of the embodiments of this disclosure, before the terminal equipment receives the first SSB, the network device may indicate the frequency-domain position of the first SSB and/or PCI to which the first SSB corresponds via measurement configuration, and the network device receives the first SSB according to the measurement configuration. And the measurement configuration may instruct the terminal equipment to report CGI-related information of a cell to which the PCI corresponds, and after the SIB1 of the cell is received, the CGI-related information of the cell is reported.

According to the first aspect of the embodiments of this disclosure, in the case of receiving the first synchronization signal/physical broadcast channel block not located on the first synchronization raster, a PDCCH is received, the PDCCH being used for scheduling a physical downlink shared channel (PDSCH) used for carrying remaining minimum system information/system information block 1 (RMSI/SIB1). Thus, after receiving the PDCCH, the terminal equipment may obtain the PDSCH scheduled by the PDCCH, and obtain the remaining minimum system information/system information block 1 (RMSI/SIB1) carried in the PDSCH.

Second Aspect of the Embodiments

The second aspect of the embodiments of this disclosure relates to a method for transmitting a signal, applied to a network device, such as the network device 201.

Figure 8:
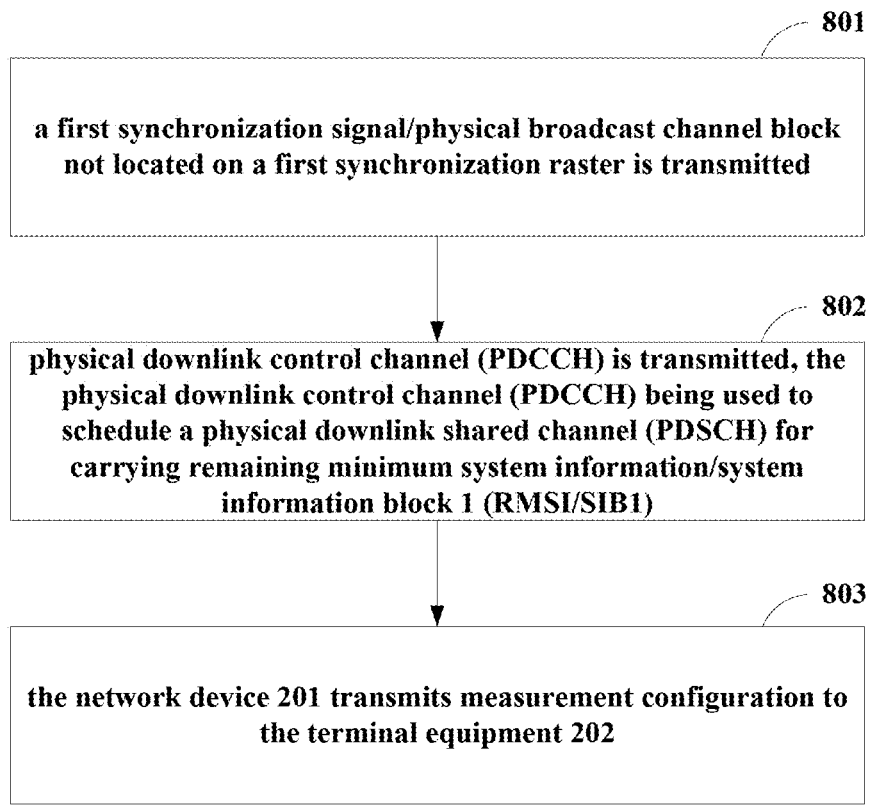
FIG. 8 is a schematic diagram of the method for transmitting a signal of the second aspect of the embodiments of this disclosure.

FIG. 8 is a schematic diagram of the method for transmitting a signal of the second aspect of the embodiments of this disclosure. As shown in FIG. 8, the method for transmitting a signal may include:
operation 801: a first synchronization signal/physical broadcast channel block (SS/PBCH block, SSB) not located on a first synchronization raster is transmitted; and
operation 802: physical downlink control channel (PDCCH) is transmitted, the physical downlink control channel (PDCCH) being used to schedule a physical downlink shared channel (PDSCH) for carrying remaining minimum system information/system information block 1 (RMSI/SIB1).

In the second aspect of the embodiments of this disclosure, in operation 802, the network device 201 transmits the physical downlink control channel (PDCCH) on resources of the control resource set (CORESET) associated with the first synchronization signal/physical broadcast channel block.

As shown in FIG. 8, the method further includes:
operation 803: the network device 201 transmits measurement configuration to the terminal equipment 202, so that the terminal equipment 202 may acquire the frequency-domain position of the first synchronization signal/physical broadcast channel block according to the measurement configuration.

In the second aspect of the embodiments of this disclosure, a relative position of a frequency-domain position of the predefined resource in frequency-domain resources of the control resource set (CORESET) to a frequency-domain position of the first synchronization signal/physical broadcast channel block is a first predetermined value.

In at least one embodiment, a relative position of a sub-band where the frequency-domain resources of the control resource set (CORESET) are located to a sub-band where the frequency-domain position of the first synchronization signal/physical broadcast channel block is located is a second predetermined value, wherein the frequency-domain resources of the control resource set (CORESET) are located in the same sub-band, and the predetermined resource of the control resource set (CORESET) is located at a predetermined position within the sub-band.

In at least one embodiment, the first synchronization signal/physical broadcast channel block may carry indication information, the indication information being able to be used to indicate a frequency-domain position of the control resource set.

For example, the indication information may indicate: a sub-band where the frequency-domain resources of the control resource set (CORESET) or a first predetermined resource in the frequency-domain resources of the control resource set are/is located, and/or a frequency-domain position of the frequency-domain resources of the control resource set (CORESET) or a second predetermined resource in the frequency-domain resources of the control resource set (CORESET) in a sub-band, wherein the first predetermined resource and the second predetermined resource are identical or different.

When the indication information indicates a sub-band, the indication information may indicate an index of the sub-band where the frequency-domain resources of the control resource set (CORESET) or the first predetermined resource in the control resource set (CORESET) are/is located.

When the indication information indicates a sub-band, the indication information may also indicate a relative position of the sub-band where the frequency-domain resources of the control resource set (CORESET) or the first predetermined resource in the control resource set (CORESET) are/is located to the sub-band where the first synchronization signal/physical broadcast channel block is located.

When the indication information indicates a sub-band, the indication information may also indicate information related to a synchronization raster to which the sub-band where the frequency-domain resources of the control resource set (CORESET) or the first predetermined resource in the control resource set (CORESET) are/is located corresponds. For example, the indication information indicates an offset between a global synchronization channel number (GSCN) of a second synchronization raster in a sub-band where the frequency-domain resources of the control resource set (CORESET) or the first predetermined resource in the control resource set are/is located and a global synchronization channel number (GSCN) of a second synchronization raster to which the first synchronization signal/physical broadcast channel block corresponds.

When the indication information indicates a frequency-domain position, the indication information indicates a relative position of the frequency-domain position of the second predetermined resource in the control resource set (CORESET) to a reference frequency-domain position.

In at least one embodiment, the relative position is the number of resource blocks and/or the number of sub-carriers.

In at least one embodiment, the reference frequency-domain position is a frequency-domain position of a third predetermined resource of the first SSB, or a frequency-domain position of a fourth predetermined resource of the second SSB, or a frequency-domain position of the first synchronization raster in the sub-band where the frequency-domain resources of the control resource set (CORESET) or the second predetermined resource in the frequency-domain resources of the control resource set are/is located.

In at least one embodiment, the reference frequency-domain position may be a preset frequency-domain position, or a frequency-domain position indicated by the network device 201.

In at least one embodiment, there exists a fixed mapping relationship between the frequency-domain position of each physical resource block of the first SSB transmitted by the network device 201 and the frequency-domain position of each physical resource block in the control resource set (CORESET).

According to the second aspect of the embodiments of this disclosure, in the case of transmitting the first synchronization signal/physical broadcast channel block not located on the first synchronization raster, the network device transmits the PDCCH on the control resource set associated with the first SSB, the PDCCH being used for scheduling a physical downlink shared channel (PDSCH) used for carrying remaining minimum system information/system information block 1 (RMSI/SIB1). Thus, after receiving the PDCCH, the terminal equipment may obtain the PDSCH scheduled by the PDCCH, and obtain the remaining minimum system information/system information block 1 (RMSI/SIB1) carried in the PDSCH.

Third Aspect of the Embodiments

The third aspect of the embodiments of this disclosure provides an apparatus for transmitting a signal, applicable to a terminal equipment, such as the terminal equipment 202. This apparatus for transmitting a signal may be used to carry out the method for transmitting a signal described in the first aspect of the embodiments.

Figure 9:
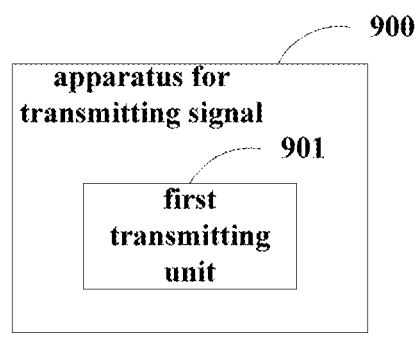
FIG. 9 is a schematic diagram of the apparatus for transmitting a signal of the third aspect of the embodiments of this disclosure.

FIG. 9 is a schematic diagram of the apparatus for transmitting a signal of the third aspect of the embodiments of this disclosure. As shown in FIG. 9, an apparatus 900 for transmitting a signal includes a first transmitting unit 901.

The first transmitting unit 901 may carry out the method for transmitting a signal described in the first aspect of the embodiments. Reference may be made to the first aspect of the embodiments for carrying out the method for transmitting a signal by the first transmitting unit 901.

Fourth Aspect of the Embodiments

The fourth aspect of the embodiments of this disclosure provides an apparatus for transmitting a signal, applicable to a network device, such as the network device 201. This apparatus for transmitting a signal may be used to carry out the method for transmitting a signal described in the second aspect of the embodiments.

Figure 10:
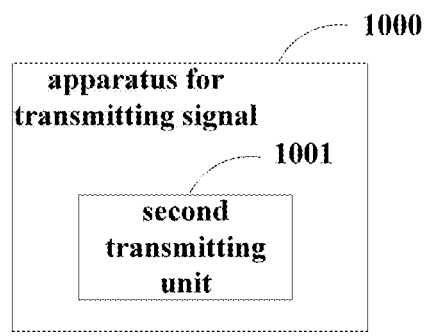
FIG. 10 is a schematic diagram of the apparatus for transmitting a signal of the fourth aspect of the embodiments of this disclosure.

FIG. 10 is a schematic diagram of the apparatus for transmitting a signal of the fourth aspect of the embodiments of this disclosure. As shown in FIG. 10, an apparatus 1000 for transmitting a signal includes a second transmitting unit 1001.

The second transmitting unit 1001 may carry out the method for transmitting a signal described in the second aspect of the embodiments. Reference may be made to the second aspect of the embodiments for carrying out the method for transmitting a signal by the second transmitting unit 1001.

Fifth Aspect of the Embodiments

The fifth aspect of the embodiments of this disclosure provides a terminal equipment, including the apparatus 900 for transmitting a signal described in the third aspect of the embodiments.

Figure 11:
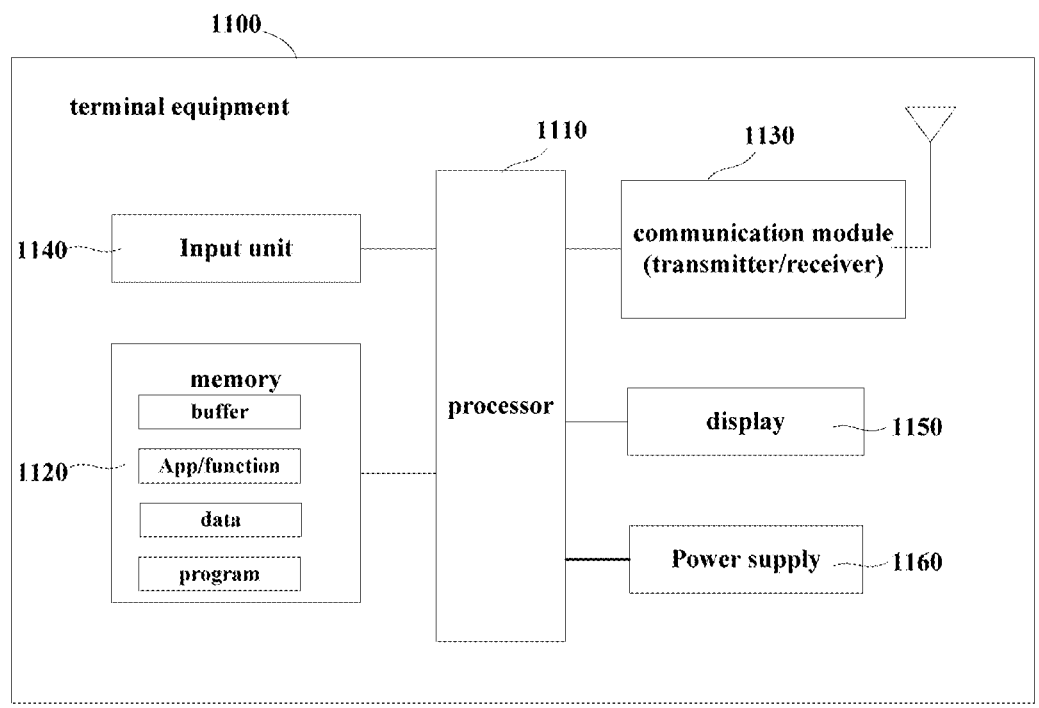
FIG. 11 is a block diagram of a systematic structure of the terminal equipment of the fifth aspect of the embodiments of this disclosure.

FIG. 11 is a block diagram of a systematic structure of a terminal equipment 1100 of the fifth aspect of the embodiments of this disclosure. As shown in FIG. 11, the terminal equipment 1100 may include a processor 1110 and a memory 1120, the memory 1120 being coupled to the processor 1110. It should be noted that this figure is illustrative only, and other types of structures may also be used, so as to supplement or replace this structure and achieve a telecommunications function or other functions.

In one implementation, the functions of the apparatus 900 for transmitting a signal may be integrated into the processor 1110. The processor 1110 may be configured to carry out method for transmitting a signal in the first aspect of the embodiments.

In another implementation, the apparatus 900 for transmitting a signal and the processor 1110 may be configured separately; for example, the apparatus 900 for transmitting a signal may be configured as a chip connected to the processor 1110, and the functions of the apparatus 900 for transmitting a signal are executed under control of the processor 1110.

As shown in FIG. 11, the terminal equipment 1100 may further include a communication module 1130, an input unit 1140, a display 1150 and a power supply 1160. It should be noted that the terminal equipment 1100 does not necessarily include all the parts shown in FIG. 11. Furthermore, the terminal equipment 1100 may include parts not shown in FIG. 11, and the prior art may be referred to.

As shown in FIG. 11, the processor 1110 is sometimes referred to as a controller or an operational control, which may include a microprocessor or other processor devices and/or logic devices. The processor 1110 receives input and controls operations of components of the terminal equipment 1100.

The memory 1120 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 1110 may execute programs stored in the memory 1120, so as to realize information storage or processing, etc. Functions of other parts are similar to those of the prior art, which shall not be described herein any further. The parts of the terminal equipment 1100 may be realized by specific hardware, firmware, software, or any combination thereof, without departing from the scope of this disclosure.

Sixth Aspect of the Embodiments

The sixth aspect of the embodiments of this disclosure provides a network device, including the apparatus 1000 for transmitting a signal described in the fourth aspect of the embodiments.

Figure 12:
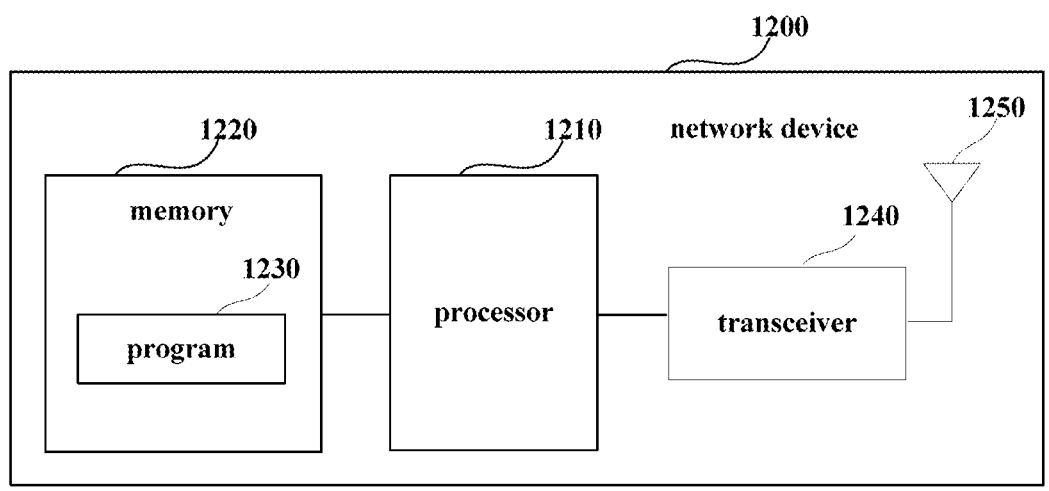
FIG. 12 is a schematic diagram of a structure of the network device of the sixth aspect of the embodiments of this disclosure.

FIG. 12 is a schematic diagram of a structure of the network device of the sixth aspect of the embodiments of this disclosure. As shown in FIG. 12, a network device 1200 may include a processor 1210 and a memory 1220, the memory 1220 being coupled to the processor 1210. The memory 1220 may store various data, and furthermore, it may store a program 1230 for data processing, and execute the program 1230 under control of the processor 1210, so as to receive various information transmitted by a user equipment, and transmit various information to the user equipment.

In one implementation, the functions of the apparatus 1000 for transmitting a signal may be integrated into the processor 1210. The processor 1210 may be configured to carry out method for transmitting a signal in the second aspect of the embodiments.

In another embodiment, the apparatus 1000 for transmitting a signal and the processor 1210 may be configured separately; for example, the apparatus 1000 for transmitting a signal may be configured as a chip connected to the processor 1210, and the functions of the apparatus 1000 for transmitting a signal are executed under control of the processor 1210.

Furthermore, as shown in FIG. 12, the network device 1200 may include a transceiver 1240, and an antenna 1250, etc. Functions of the above components are similar to those in the prior art, and shall not be described herein any further. It should be noted that the network device 1200 does not necessarily include all the parts shown in FIG. 12. Furthermore, the network device 1200 may include parts not shown in FIG. 12, and the prior art may be referred to.

Seventh Aspect of the Embodiments

The seventh aspect of the embodiments of this disclosure provides a communication system, including the network device described in the sixth aspect of the embodiments and the terminal equipment described in the fifth aspect of the embodiments.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the spirits and principle of this disclosure, and such variants and modifications fall within the scope of this disclosure.

As to the implementations including the above embodiments, following supplements are further disclosed.

1. A method for transmitting a signal, applicable to a terminal equipment, the method including:
   receiving a first synchronization signal/physical broadcast channel block (SS/PBCH block, SSB), the first synchronization signal/physical broadcast channel block being not located on a first synchronization raster; and
   receiving physical downlink control channel (PDCCH), the physical downlink control channel (PDCCH) being used to schedule a physical downlink shared channel (PDSCH) for carrying remaining minimum system information/system information block 1 (RMSI/SIB1).

2. The method according to supplement 1, wherein the method further includes:
   determining a control resource set used for transmitting a physical downlink control channel by the terminal equipment before receiving the physical downlink control channel according to the frequency-domain position of the first synchronization signal/physical broadcast channel block and/or the indication information carried by the first synchronization signal/physical broadcast channel block.

3. The method according to supplement 2, wherein,
   a relationship between the control resource set and the frequency-domain position of the first SSB is predefined.

4. The method according to supplement 2 or 3, wherein a relative position of a frequency-domain of a predetermined resource in frequency-domain resources of the control resource set (CORESET) to a frequency-domain position of the first synchronization signal/physical broadcast channel block is a first predetermined value.

5. The method according to supplement 2 or 3, wherein,
   a relative position of a sub-band where the frequency-domain resources of the control resource set are located to a sub-band where the frequency-domain position of the first synchronization signal/physical broadcast channel block is located is a second predetermined value;
   wherein the frequency-domain resources of the control resource set (CORESET) are located in the same sub-band, and the predetermined resource of the control resource set (CORESET) is located at a predetermined position within the sub-band.

6. The method according to supplement 5, wherein,
   predetermined positions of the predetermined resource of the control resource set (CORESET) in different sub-bands are identical or different.

7. The method according to supplement 5 or 6, wherein,
   for different subcarrier spacings, predetermined positions of the predetermined resource of the control resource set (CORESET) in the same sub-band are identical or different.

8. The method according to supplement 2, wherein,
   the indication information is used to indicate the frequency-domain position of the control resource set.

8a. The method according to supplement 2, wherein,
   the indication information is used to indicate the frequency-domain position of the control resource set based on a reference frequency-domain position.

9. The method according to supplement 8, wherein,
   the indication information indicates:
   a sub-band where the frequency-domain resources of the control resource set (CORESET) or a first predetermined resource in the frequency-domain resources of the control resource set are/is located; and/or
   frequency-domain positions of the frequency-domain resources of the control resource set (CORESET) or a frequency-domain position of a second predetermined resource in the frequency-domain resources of the control resource set (CORESET);
   wherein the first predetermined resource and the second predetermined resource are identical or different.

10. The method according to supplement 9, wherein,
    the indication information indicates an index of the sub-band where the frequency-domain resources of the control resource set (CORESET) or the first predetermined resource in the frequency-domain resources of the control resource set are/is located; or
    the indication information indicates a relative position of the sub-band where the frequency-domain resources of the control resource set (CORESET) or the first predetermined resource in the frequency-domain resources of the control resource set are/is located to a sub-band where the frequency-domain position of the first synchronization signal/physical broadcast channel block; or
    the indication information indicates information related to a synchronization raster in the sub-band where the frequency-domain resources of the control resource set (CORESET) or the first predetermined resource in the frequency-domain resources of the control resource set (CORESET) are/is located.

11. The method according to supplement 10, wherein,
    the indication information indicates an offset between a global synchronization channel number (GSCN) of a second synchronization raster in the sub-band where the frequency-domain resources of the control resource set (CORESET) or the first predetermined resource are/is located and a global synchronization channel number (GSCN) of a second synchronization raster to which the first synchronization signal/physical broadcast channel block corresponds.

12. The method according to supplement 9, wherein,
    the indication information indicates a relative position of a frequency-domain position of the second predetermined resource in the control resource set (CORESET) to a reference frequency-domain position.

13. The method according to supplement 12, wherein,
    the reference frequency-domain position is predefined, or is indicated by the network device.

14. The method according to supplement 13, wherein,
    the reference frequency-domain position is a frequency-domain position of a third predetermined resource of the first SSB, or a frequency-domain position of a fourth predetermined resource of the second SSB, or a frequency-domain position of the first synchronization raster in the sub-band where the frequency-domain resources of the control resource set or the second predefined resource in the frequency-domain resources of the control resource set are/is located.

15. The method according to supplement 12, wherein,
    the relative position is the number of resource blocks and/or the number of subcarriers.

16. The method according to supplement 2, wherein,
    there exists a fixed mapping relationship between a frequency-domain position of each physical resource block of the first SSB and a frequency-domain position of each physical resource block in the control resource set (CORESET).

17. A method for transmitting a signal, applicable to a network device, the method including:
    transmitting a first synchronization signal/physical broadcast channel block (SS/PBCH block, SSB) not located on a first synchronization raster; and
    transmitting physical downlink control channel (PDCCH), the physical downlink control channel (PDCCH) being used to schedule a physical downlink shared channel (PDSCH) for carrying remaining minimum system information/system information block 1 (RMSI/SIB1).

18. The method according to supplement 17, wherein,
    the physical downlink control channel (PDCCH) is transmitted on resources of a control resource set (CORESET) associated with the first synchronization signal/physical broadcast channel block.

19. The method according to supplement 18, wherein the method further includes:
    transmitting measurement configuration by the network device to the terminal equipment, the measurement configuration instructing the terminal equipment to acquire the frequency-domain position of the first synchronization signal/physical broadcast channel block.

20. The method according to supplement 18, wherein,
    a relative position of a frequency-domain of a predetermined resource in frequency-domain resources of the control resource set (CORESET) to a frequency-domain position of the first synchronization signal/physical broadcast channel block is a first predetermined value.

21. The method according to supplement 18, wherein,
    a relative position of a sub-band where frequency-domain resources of the control resource set (CORESET) are located to a sub-band where the frequency-domain position of the first synchronization signal/physical broadcast channel block is located is a second predetermined value;
    wherein the frequency-domain resources of the control resource set (CORESET) are located in the same sub-band, and the predetermined resource of the control resource set (CORESET) is located at a predetermined position within the sub-band.

22. The method according to supplement 21, wherein,
    predetermined positions of the predetermined resource of the control resource set (CORESET) in different sub-bands are identical or different.

23. The method according to supplement 21 or 22, wherein,
    for different subcarrier spacings, predetermined positions of the predetermined resource of the control resource set (CORESET) in the same sub-band are identical or different.

24. The method according to supplement 18, wherein,
    the first synchronization signal/physical broadcast channel block carries indication information, the indication information being used to indicate the frequency-domain position of the control resource set.

25. The method according to supplement 18, wherein,
    the indication information indicates:
    a sub-band where the frequency-domain resources of the control resource set (CORESET) or a first predetermined resource in the frequency-domain resources of the control resource set are/is located; and/or frequency-domain positions the frequency-domain resources of the control resource set (CORESET) in a sub-band or a frequency-domain position of a second predetermined resource in the frequency-domain resources of the control resource set (CORESET) in a sub-band;
    wherein the first predetermined resource and the second predetermined resource are identical or different.

26. The method according to supplement 25, wherein,
    the indication information indicates an index of the sub-band where the frequency-domain resources of the control resource set (CORESET) or the first predetermined resource in the frequency-domain resources of the control resource set are/is located; or
    the indication information indicates a relative position of the sub-band where the frequency-domain resources of the control resource set (CORESET) or the first predetermined resource in the frequency-domain resources of the control resource set are/is located to a sub-band where the frequency-domain position of the first synchronization signal/physical broadcast channel block; or
    the indication information indicates information related to a synchronization raster in the sub-band where the frequency-domain resources of the control resource set (CORESET) or the first predetermined resource in the frequency-domain resources of the control resource set (CORESET) are/is located.

27. The method according to supplement 26, wherein,
    the indication information indicates an offset between a global synchronization channel number (GSCN) of a second synchronization raster in the sub-band where the frequency-domain resources of the control resource set (CORESET) or the first predetermined resource are/is located and a global synchronization channel number (GSCN) of a second synchronization raster to which the first synchronization signal/physical broadcast channel block corresponds.

28. The method according to supplement 25, wherein,
    the indication information indicates a relative position of a frequency-domain position of the second predetermined resource in the control resource set (CORESET) to a reference frequency-domain position.

29. The method according to supplement 28, wherein the method further includes: indicating the reference frequency-domain position by the network device.

30. The method according to supplement 29, wherein,
    the reference frequency-domain position is a frequency-domain position of a third predetermined resource of the first SSB, or a frequency-domain position of a fourth predetermined resource of the second SSB, or a frequency-domain position of the first synchronization raster in the sub-band where the frequency-domain resources of the control resource set or the second predefined resource in the frequency-domain resources of the control resource set are/is located.

31. The method according to supplement 28, wherein,
    the relative position is the number of resource blocks and/or the number of subcarriers.

32. The method according to supplement 18, wherein,
    there exists a fixed mapping relationship between a frequency-domain position of each physical resource block of the first SSB transmitted by the network device and a frequency-domain position of each physical resource block in the control resource set (CORESET).

What is claimed is:

1. An apparatus for receiving a signal, applicable to a terminal equipment, wherein the apparatus comprises:
a receiver configured to:
receive a first synchronization signal/physical broadcast channel block (SS/PBCH block, SSB), the first synchronization signal/physical broadcast channel block being not located on a first synchronization raster;
receive physical downlink control channel (PDCCH), the physical downlink control channel (PDCCH) being used to schedule a physical downlink shared channel (PDSCH) for carrying remaining minimum system information/system information block 1 (RMSI/SIB1); and
determine a control resource set (CORESET) used for receiving the PDCCH according to indication information carried by the first SSB before receiving the PDCCH,
wherein the indication information indicates a relative position of a frequency-domain position of a second predetermined resource of the CORESET to a frequency-domain position of a fourth predetermined resource of a second SSB, the second SSB being located on the first synchronization raster.

2. The apparatus according to claim 1, wherein,
a relationship between the control resource set and the frequency-domain position of the first SSB is predefined; or
the CORESET and the first SSB are located in a same sub-band.

3. The apparatus according to claim 1, wherein,
the indication information is used to indicate the frequency-domain position of the CORESET.

4. The apparatus according to claim 1, wherein,
the indication information indicates the frequency-domain position of the CORESET based on a reference frequency-domain position.

5. The apparatus according to claim 3, wherein,
the indication information indicates:
a sub-band where frequency-domain resources of the CORESET or a first predetermined resource in frequency-domain resources of the CORESET are/is located; and/or
frequency-domain positions of frequency-domain resources of the control resource set CORESET or the frequency-domain position of the second predetermined resource in frequency-domain resources of the CORESET,
wherein the first predetermined resource and the second predetermined resource are identical or different.

6. The apparatus according to claim 1, wherein,
the relative position is in a number of resource blocks and/or the number of subcarriers.

7. The apparatus according to claim 1, wherein,
the indication information indicates an index of a sub-band where frequency-domain resources of the CORESET or a first predetermined resource in the CORESET are/is located; or
the indication information indicates a relative position of the sub-band where the frequency-domain resources of the CORESET or the first predetermined resource in the CORESET are/is located to a sub-band where the frequency-domain position of the first SSB is located; or
the indication information indicates information related to a synchronization raster in the sub-band where the frequency-domain resources of the CORESET or the first predetermined resource in the CORESET are/is located.

8. The apparatus according to claim 6, wherein,
the indication information indicates an offset between a global synchronization channel number (GSCN) of a second synchronization raster in a sub-band where the frequency-domain resources of the CORESET or a first predetermined resource are/is located and a global synchronization channel number (GSCN) of a second synchronization raster to which the first SSB corresponds.

9. The apparatus according to claim 1, wherein,
the indication information indicates an offset between a first RB of the CORESET and the first common RB overlapping with the first RB of the second SSB.

10. The apparatus according to claim 1, wherein,
there exists a fixed mapping relationship between frequency-domain position of each physical resource block in the CORESET.

11. An apparatus for transmitting a signal, applicable to a network device, wherein the apparatus comprises a transmitter configured to:
transmit a first synchronization signal/physical broadcast channel block (SS/PBCH block, SSB) not located on a first synchronization raster; and
transmit physical downlink control channel (PDCCH), the physical downlink control channel (PDCCH) being used to schedule a physical downlink shared channel (PDSCH) for carrying remaining minimum system information/system information block 1 (RMSI/SIB1),
wherein the PDCCH is transmitted on resources of a control resource set (CORESET) associated with the first SSB,
the first SSB carries indication information, and
the indication information indicates a relative position of a frequency-domain position of a second predetermined resource in the CORESET to a frequency-domain position of a fourth predetermined resource of a second SSB, the second SSB being located on the first synchronization raster.

12. The apparatus according to claim 11, wherein,
the relative position is the number of resource blocks and/or the number of subcarriers.

13. The apparatus according to claim 11, wherein,
the indication information indicates an offset between a first RB of the CORESET and the first common RB overlapping with the first RB of the second SSB.

14. A communication system, comprising:
a terminal equipment comprising a receiver configured to:
receive a first synchronization signal/physical broadcast channel block (SS/PBCH block, SSB), the first synchronization signal/physical broadcast channel block being not located on a first synchronization raster; and
receive physical downlink control channel (PDCCH), the physical downlink control channel (PDCCH) being used to schedule a physical downlink shared channel (PDSCH) for carrying remaining minimum system information/system information block 1 (RMSI/SIB1); and
determine a control resource set (CORESET) used for receiving the PDCCH according to indication information carried by the first SSB before receiving the PDCCH,
wherein the indication information indicates a relative position of a frequency-domain position of a second predetermined resource of the CORESET to a frequency-domain position of a fourth predetermined resource of a second SSB, the second SSB being located on the first synchronization raster, a network device comprising a transmitter configured to:

transmit a first synchronization signal/physical broadcast channel block (SS/PBCH block, SSB) not located on a first synchronization raster; and transmit physical downlink control channel (PDCCH), the physical downlink control channel (PDCCH) being used to schedule a physical downlink shared channel (PDSCH) for carrying remaining minimum system information/system information block 1 (RMSI/SIB1).

* * * * *